(12) United States Patent
Vaughn et al.

(10) Patent No.: US 11,088,562 B2
(45) Date of Patent: Aug. 10, 2021

(54) VEHICLE IMPLEMENTED WIRELESS CHARGING

(71) Applicant: INTERNATIONAL BUSINESS MACHINES CORPORATION, Armonk, NY (US)

(72) Inventors: Garfield Vaughn, South Windsor, CT (US); Bryan A. Barone, Orlando, FL (US); Moncef Benboubakeur, Brno (CZ); Julija Narodicka, Brno (CZ)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/019,931

(22) Filed: Jun. 27, 2018

(65) Prior Publication Data
US 2020/0006975 A1    Jan. 2, 2020

(51) Int. Cl.
*H02J 7/00*    (2006.01)
*H02J 7/02*    (2016.01)
(Continued)

(52) U.S. Cl.
CPC ............... *H02J 7/025* (2013.01); *B60L 1/00* (2013.01); *B60L 53/30* (2019.02); *H02J 7/0021* (2013.01);
(Continued)

(58) Field of Classification Search
CPC ........ H02J 7/025; H02J 7/0021; H02J 7/0027; H02J 7/02; H02J 7/00045; H02J 7/00034;
(Continued)

(56) References Cited

U.S. PATENT DOCUMENTS 7,860,680 B2    12/2010  Arms et al.
8,736,228 B1 *   5/2014  Freed ...................... H02J 50/90
                                                   320/115
(Continued)

FOREIGN PATENT DOCUMENTS

WO    2007015206    2/2007

OTHER PUBLICATIONS

Szondy, David; Quadrotor UAVs used to wirelessly deliver power; Jun. 5, 2012; https://newatlas.com/quadrotor-wireless-charging/22753/; 3 pages.
(Continued)

*Primary Examiner* — Richard Isla
*Assistant Examiner* — Johali A Torres Ruiz
(74) *Attorney, Agent, or Firm* — Schmeiser, Olsen & Watts; Brian M. Restauro

(57) ABSTRACT

A method and system for improving vehicle implemented wireless charging. The method includes registering devices with a controller hardware apparatus. Charging attributes of the devices are generated based on analysis of operational data associated with the devices and associated charging code for implementing a charging plan for wirelessly charging a power source for each device is generated and executed. A first device comprising a power source requiring a charge is identified and a vehicle is deployed to a location of the first device. A charging process for charging the power source is executed upon arrival of the vehicle to the location of the first device.

16 Claims, 7 Drawing Sheets

(51) Int. Cl.
*B60L 1/00* (2006.01)
*B60L 53/30* (2019.01)
*B60L 53/65* (2019.01)
*H02J 50/80* (2016.01)

(52) U.S. Cl.
CPC .............. *H02J 7/0027* (2013.01); *B60L 53/65* (2019.02); *H02J 7/00034* (2020.01); *H02J 7/00045* (2020.01); *H02J 50/80* (2016.02); *Y02T 10/70* (2013.01); *Y02T 10/7072* (2013.01); *Y02T 90/12* (2013.01); *Y02T 90/16* (2013.01)

(58) Field of Classification Search
CPC ........ H02J 50/00; H02J 50/80; H02J 2310/44; B60L 1/00; B60L 53/30; B60L 53/65; B60L 53/68; Y02T 90/12; Y02T 90/167; Y02T 90/169; Y02T 10/70; Y02T 10/7072; Y04S 30/14
See application file for complete search history.

(56) References Cited

U.S. PATENT DOCUMENTS

| | | | |
|---|---|---|---|
| 9,492,922 B1* | 11/2016 | Johnson | H02J 7/00047 |
| 9,778,653 B1* | 10/2017 | McClintock | B67D 7/0401 |
| 2009/0284245 A1 | 11/2009 | Kirby et al. | |
| 2010/0171464 A1* | 7/2010 | Choi | H02J 7/0044 320/114 |
| 2011/0025267 A1 | 2/2011 | Kamen et al. | |
| 2011/0093139 A1 | 4/2011 | Arms et al. | |
| 2012/0005031 A1 | 1/2012 | Jammer | |
| 2016/0204642 A1* | 7/2016 | Oh | H02J 50/12 320/108 |
| 2016/0292403 A1* | 10/2016 | Gong | G06F 21/31 |
| 2018/0131240 A1* | 5/2018 | Alperin | H02J 3/008 |
| 2018/0254669 A1* | 9/2018 | Rahman | H02J 7/025 |
| 2019/0028904 A1* | 1/2019 | Carpenter | G08G 5/0091 |
| 2019/0224852 A1* | 7/2019 | Choi | H02J 7/00 |
| 2019/0356174 A1* | 11/2019 | Shen | H01M 10/44 |

OTHER PUBLICATIONS

Mittleider, Andrew et al.; Experimental Analysis of a UAV-Based Wireless Power Transfer Localization System; Experimental Robotics: The 14th International Symposium on Experimental Robotics; Jun. 15-18, 2014; pp. 357-371.

Johnson, Jennifer et al.; Charge Selection Algorithms for Maximizing Sensor Network Life with UAV-Based Limited Wireless Recharging; 2013 IEEE Eighth International Conference on Intelligent Sensors, Sensor Networks and Information Processing; Apr. 2-5, 2013; 6 pages.

He, Liang et al.; Mobile-to-Mobile Energy Replenishment in Mission-Critical Robotic Sensor Networks; IEEE Conference on Computer Communications; Apr. 27-May 2, 2014; 9 pages.

Chen, Feiyu et al.; Speed control of mobile chargers serving wireless rechargeable networks; Future Generation Computer Systems (2017); http://dx.doi.org/10.1026/j.future.016.12.011; 8 pages.

YouTube.com; Cleaning Device Concept Triggers Tiny robots to Clean Your House; GeoBeats TechNews; Oct. 16, 2013; https://www.youtube.com/watch?v=wJ ItbcHVZh4; 3 pages.

* cited by examiner

US 11,088,562 B2

VEHICLE IMPLEMENTED WIRELESS CHARGING

FIELD

The present invention relates generally to a method for wirelessly charging a device using a vehicle and in particular to a method and associated system for improving wireless charging technology associated with providing device charging attributes and deploying at least one vehicle to a location of a device requiring a charge based on the charging attributes.

BACKGROUND

Accurately and efficiently providing power for devices typically includes an inaccurate process with little flexibility. Determining device energy consumption patterns may include a complicated process that may be time consuming and require a large amount of resources. Accordingly, there exists a need in the art to overcome at least some of the deficiencies and limitations described herein above.

SUMMARY

A first aspect of the invention provides a vehicle implemented wireless charging improvement method comprising: registering, by a processor of a controller hardware apparatus, a plurality of devices with the controller hardware apparatus; generating, by the processor based on analysis of operational data associated with the plurality of devices, charging attributes of the plurality of devices; generating, by the processor based on the charging attributes, charging code for implementing a charging plan for wirelessly charging a power source for each device of the plurality of devices; executing, by the processor, the charging code; identifying, by the processor in response to the executing, a first device of the plurality of devices comprising a first power source requiring a charge; deploying, by the processor based on results of the identifying, at least one vehicle to a location of the first device; and executing upon arrival of the at least one vehicle to the location of the first device, by the processor via the at least one vehicle, a charging process for charging the first power source.

A second aspect of the invention provides computer program product, comprising a computer readable hardware storage device storing a computer readable program code, the computer readable program code comprising an algorithm that when executed by a processor of a controller hardware apparatus implements a vehicle implemented wireless charging improvement method, the method comprising: registering, by the processor, a plurality of devices with the controller hardware apparatus; generating, by the processor based on analysis of operational data associated with the plurality of devices, charging attributes of the plurality of devices; generating, by the processor based on the charging attributes, charging code for implementing a charging plan for wirelessly charging a power source for each device of the plurality of devices; executing, by the processor, the charging code; identifying, by the processor in response to the executing, a first device of the plurality of devices comprising a first power source requiring a charge; deploying, by the processor based on results of the identifying, at least one vehicle to a location of the first device; and executing upon arrival of the at least one vehicle to the location of the first device, by the processor via the at least one vehicle, a charging process for charging the first power source.

A third aspect of the invention provides server hardware device comprising a processor coupled to a computer-readable memory unit, the memory unit comprising instructions that when executed by the computer processor implements a vehicle implemented wireless charging improvement method comprising: registering, by the processor, a plurality of devices with the controller hardware apparatus; generating, by the processor based on analysis of operational data associated with the plurality of devices, charging attributes of the plurality of devices; generating, by the processor based on the charging attributes, charging code for implementing a charging plan for wirelessly charging a power source for each device of the plurality of devices; executing, by the processor, the charging code; identifying, by the processor in response to the executing, a first device of the plurality of devices comprising a first power source requiring a charge; deploying, by the processor based on results of the identifying, at least one vehicle to a location of the first device; and executing upon arrival of the at least one vehicle to the location of the first device, by the processor via the at least one vehicle, a charging process for charging the first power source.

The present invention advantageously provides a simple method and associated system capable of accurately and efficiently providing power for devices.

DETAILED DESCRIPTION

Figure 1:
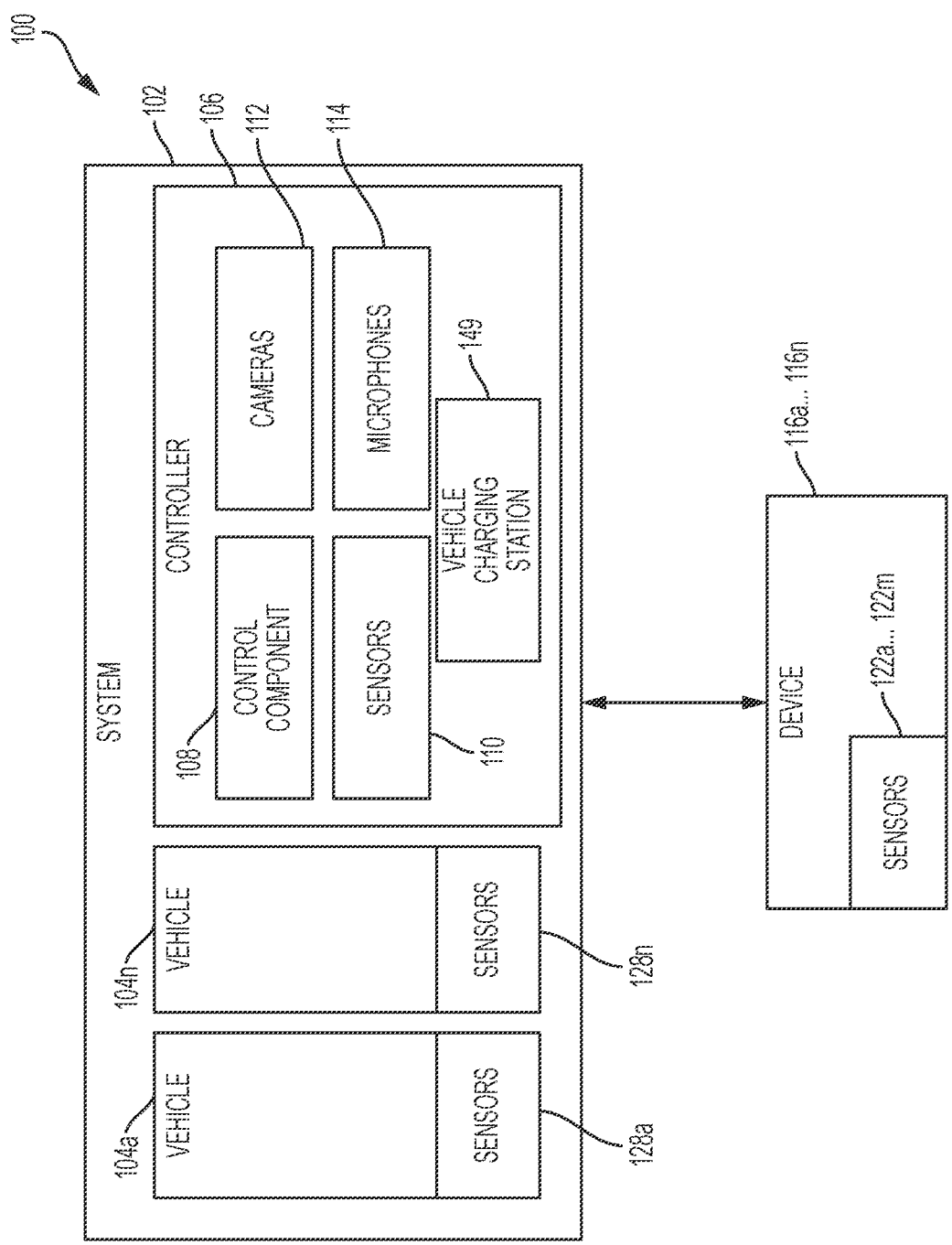
FIG. 1 illustrates a block diagram depicting a system for improving wireless charging technology associated with providing device charging attributes and deploying at least one vehicle to a location of devices requiring a charge based on the charging attributes, in accordance with embodiments of the present invention.

FIG. 1 illustrates a block diagram 100 depicting a system 102 for improving wireless charging technology associated with providing device charging attributes and deploying at least one vehicle to a location of devices 116a . . . 116n requiring a charge based on the charging attributes, in accordance with embodiments of the present invention.

As illustrated in block diagram 100, system 102 is configured to wirelessly charge devices 116a . . . 116n using at least one of vehicles 104a . . . 104n. System 102 includes vehicles 104a . . . 104n in communication with a controller 106. Controller 106 may include: a control component 108, cameras 112, sensors 110 (e.g., optical sensors, a thermal imaging apparatus/sensor, optical and vibrational sensors, voltage sensors, RFID sensors, etc.), and microphones 114. Further modules and engines may be included in the controller 106, such as, inter alia, GPS units. The system 102 may be configured to interact wirelessly with one or more devices, such as a devices 116a . . . 116n. Devices 116a . . . 116n may include a handheld computing device, such as a smartphone, a laptop, a tablet, etc. Vehicles 104a . . . 104n may include sensors 128a . . . 128n such as, inter alia, a video camera, a microphone, optical sensors, a thermal imaging apparatus/sensor, optical and vibrational sensors, voltage sensors, RFID sensors, GPS sensors, etc. Vehicles 104a . . . 104n and controller 106 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 104a . . . 104n and controller 106 may each comprise a specialized hardware device comprising specialized (non-generic) hardware and circuitry (i.e., specialized discrete non-generic analog, digital, and logic based circuitry) for executing a process described with respect to FIGS. 1-7. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving wireless charging technology associated with providing device charging attributes and deploying at least one vehicle to a location of devices 116a . . . 116n requiring a charge based on the charging attributes. Controller 106 includes a memory system 8 and control component 108 to execute a process for automatically enabling a vehicular charging process. Additionally, controller 106 may include a battery charging station 149 for recharging batteries of vehicles 104a . . . 104n. The memory system 8 may include a single memory system. Alternatively, the memory system may include a plurality of memory systems. Each of vehicles 104a . . . 104n may comprise any vehicle that does not require a human operator to be located within the vehicles 104a . . . 104n such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicles 114a . . . 114n to know it's location and self-determine a route to a device requiring a charge), a pre-programmed vehicle, a robotic based structure, etc. Alternatively, vehicles 104a . . . 104n may comprise any type of vehicle that includes a human operator located within the vehicle (e.g., an aircraft, an automobile, a boat or ship, a train, etc.). Vehicles 104a . . . 104n may include, inter alia, an aerial vehicle, a land based vehicle, a marine (water) based vehicle, etc.

According to an example, controller 106 may be configured to utilize one or more of the sensors 110, the cameras 112, and the microphones 114 to monitor parameters of devices 116a . . . 116n. It should be appreciated that multiple quantities of the sensors 110, the cameras 112, and the microphones 114 are contemplated and the quantities are not numerically limited. The parameters may include, inter alia, a battery level of devices 116a . . . 116n, a usage level associated with a users' most frequent usage time during the day of devices 116a . . . 116n (e.g., a high usage level between 9 AM-5 PM for a first user, a high usage level between 12 PM-7 PM for a second user, etc.), and/or a users' most frequent usage level associated with a usage day of the week of devices 116a . . . 116n (e.g., a high usage level on Mondays and Tuesdays for the first user, a high usage level on the weekend for a second user, etc.).

In response to detecting a battery level of any of devices 116a . . . 116n as falling below a threshold, controller 106 may identify a quantity of vehicles 104a . . . 104n necessary to increase a battery level of any of devices 116a . . . 116n to a level above the threshold. The threshold may be a default threshold or may be user-defined/user-customizable. In some examples, the threshold may be measured as a percentage. For example, if the battery level of a device falls below a 10% threshold, vehicles 104a . . . 104n may be deployed to discharge energy into the device.

Controller 106 may further determine a location of the identified quantity of vehicles 104a . . . 104n in spatial relation to a location of devices 116a . . . 116n. Upon determining the location of the identified quantity of the vehicles 104a . . . 104n, controller 106 may deploy the identified quantity of vehicles 104a . . . 104n to the devices 116a . . . 116n to discharge stored energy into device to increase the battery level of the device to the level above the threshold.

In some examples, controller 106 may deploy the identified quantity of vehicles 104a . . . 104n to charge devices 116a . . . 116n during a time period associated with a low device usage level of a user (e.g., between 6 PM-8 PM for the first user or between 8 PM-10 PM for the second user). In further examples, controller 106 may deploy the identified quantity of vehicles 104a . . . 104n to charge device 116s . . . 116n during days of the week associated with a low device usage level of a user (e.g., on Wednesdays, Thursdays, or Fridays for the first user or on weekdays for the second user). In further examples, the identified quantity of vehicles 104a . . . 104n may discharge the stored energy into any of devices 116a . . . 116n while any of vehicles 104a . . . 104n are in motion. For example, one of vehicles 104a . . . 104n may mechanically couple itself to any of devices 116a . . . 116n (e.g., via magnetic means, via mechanical attachment arms, etc.) for wireless or connected wire based charging. Alternatively, one of vehicles 104a . . . 104n may maintain a position adjacent to any of devices 116a . . . 116n for wireless based charging. In other examples, the identified quantity of vehicles 104a . . . 104n may discharge the stored energy into devices 116a . . . 116n while a vehicle is not in motion. It should be appreciated that these examples are merely illustrative and additional examples are contemplated.

Figure 2:
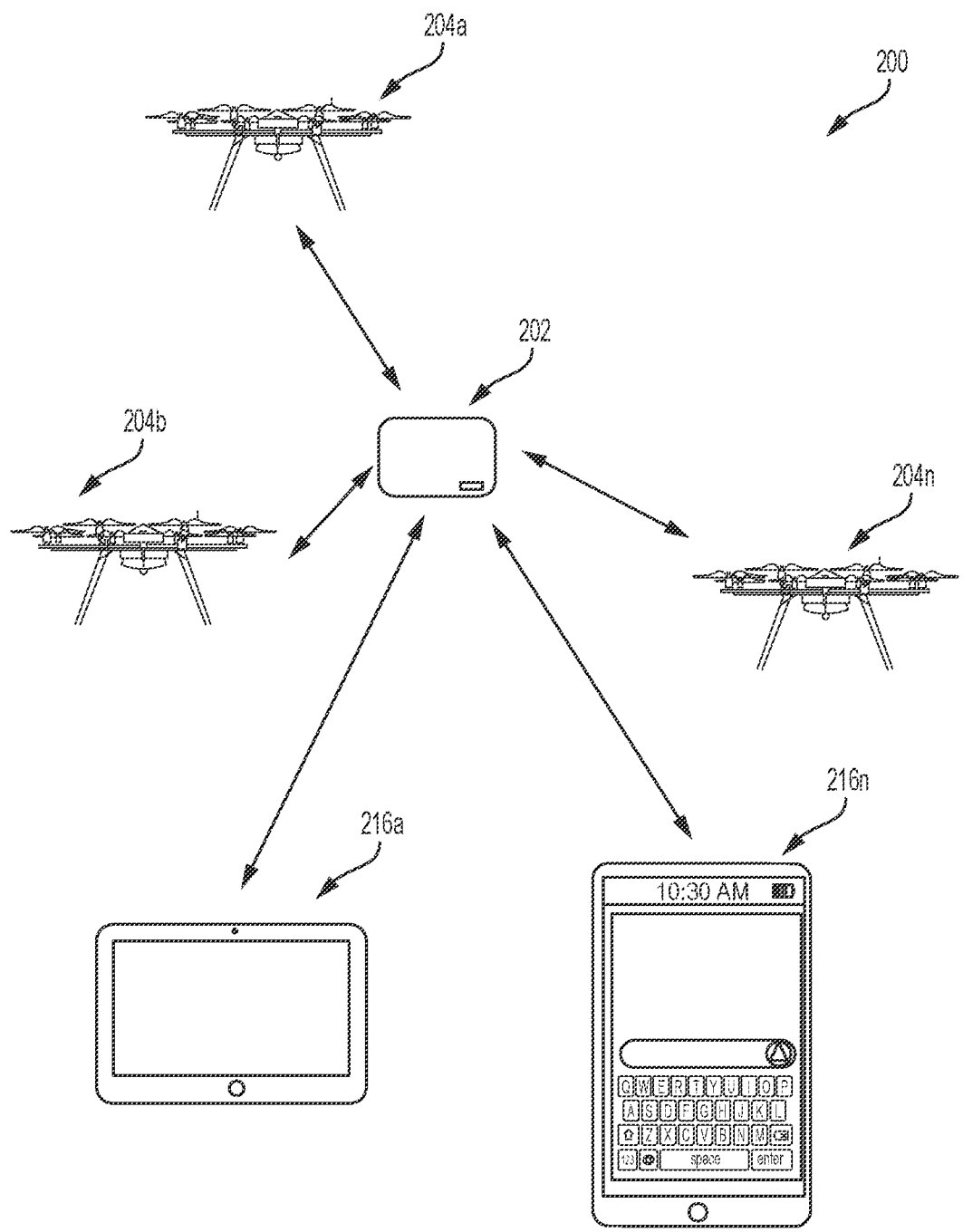
FIG. 2 illustrates a schematic diagram representing a system configured to wirelessly charge devices using vehicles, in accordance with embodiments of the present invention.

FIG. 2 illustrates a schematic diagram representing a system 200 configured to wirelessly charge devices 216a . . . 216n using vehicles 204a . . . 204n, in accordance with embodiments of the present invention. System 200 includes: a controller 202 (e.g., controller 106 of FIG. 1) that may wirelessly interact with vehicles 204a . . . 204n (e.g., vehicles 104a . . . 104n of FIG. 1) and devices 216a . . . 216n (e.g., device 116a . . . 116n of FIG. 1). As described, supra, in relation to FIG. 1, devices 216a . . . 216n may include a laptop computer, a handheld tablet and/or a smartphone, among other devices.

In some examples, controller 202 may detect a user being in contact with devices 216a . . . 216n at one or more positions (e.g., one or more fingers of the user are in contact with one of devices 216a . . . 216n). In response, controller 202 may prompt the user to remove one of devices 216a . . . 216n from possession of the user to allow the identified quantity of vehicles 204a . . . 204n to interact with devices 216a . . . 216n to increase battery level of a device to a level above a default or user-customizable threshold. The prompt may include: audio prompts, visual prompts, auditory prompts, tactile prompts, etc. In some examples, subsequent to discharging the stored energy into devices 216a . . . 216n, vehicles 204a . . . 204n may utilize a portion of the stored energy for a self-charging process to transport itself/return to controller 202 to receive a full charge.

In further examples, system 200 may utilize one or more algorithms to identify a quantity of vehicles 204a . . . 204n needed to charge any of devices 216a . . . 216n. In further examples, the one or more algorithms may include reinforcement learning algorithms that may be utilized to retrain (generating self-learning code) system 200 during a subsequent time period. For example, if three of vehicles 204a . . . 204n were needed to charge a smartphone of a first user on a Tuesday at 9 AM to a level above a 50% battery threshold, the one or more reinforcement learning algorithms will direct the three of vehicles 204a . . . 204n to the smartphone of the first user on the subsequent Tuesday at 9 AM to charge the smartphone to the level above the 50% battery threshold. In other examples, system 200 may utilize the one or more algorithms to schedule maintenance on one or more of vehicles 204a . . . 204n and/or the controller 202. In some examples, this maintenance will be scheduled during low usage times of the day and/or days of the week associated with devices 216a . . . 216n.

In another example, system 200 may receive a signal, such as an emergency distress signal, from a device (e.g., one of devices 216a . . . 216n) not registered with system 200. When the device is registered, one or more users may create profiles with user-specific parameters for the system. In some examples, an emergency distress signal may be associated with a battery level of the unregistered device being below the threshold or may be associated with needed repairs to the device. Responsive to this, system 200 may identify quantity of vehicles (e.g., one of vehicles 204a . . . 204n) needed to address the emergency distress signal (e.g., a number of vehicles necessary to increase the battery level to a level above the threshold or a number of vehicles necessary to repair the device). Subsequently, system 200 may identify a location of the identified number vehicles in relation to the location of the unregistered device. Lastly, system 200 may deploy the identified quantity vehicles to the unregistered device to discharge (e.g., via wireless or wired means) the stored energy (e.g., bringing a power source of the device up to a specified voltage level) into the unregistered device to increase the battery level of the unregistered device to the level above the threshold.

Figure 3:
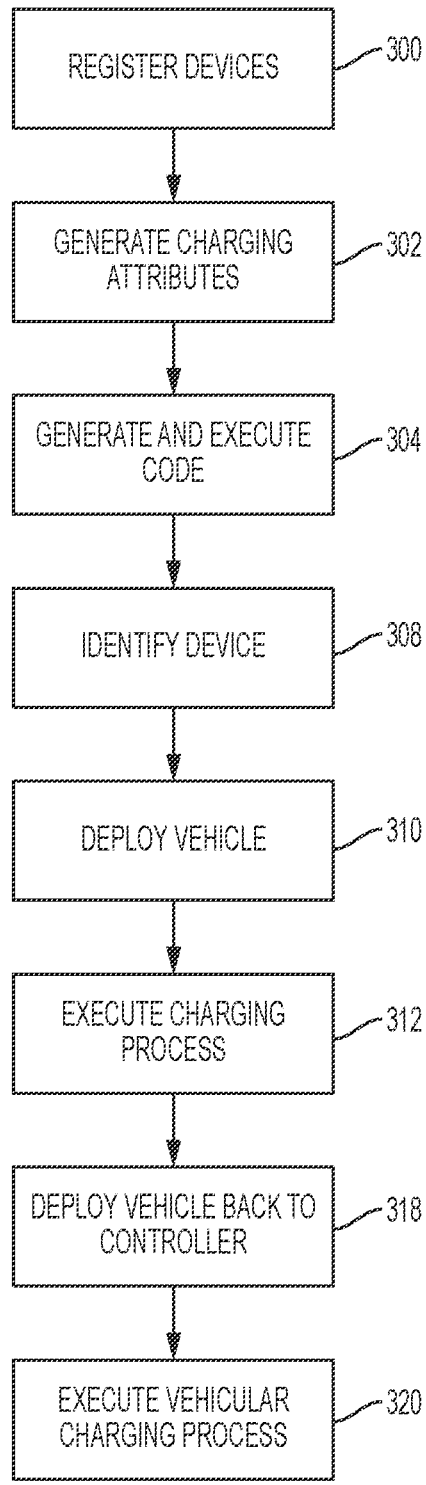
FIG. 3 illustrates an algorithm detailing a process enabled by the system of FIG. 1 for improving wireless charging technology associated with providing device charging attributes and deploying at least one vehicle to a location of devices requiring a charge based on the charging attributes, in accordance with embodiments of the present invention.

FIG. 3 illustrates an algorithm detailing a process enabled by system 100 of FIG. 1 for improving wireless charging technology associated with providing device charging attributes and deploying at least one vehicle to a location of devices requiring a charge based on the charging attributes, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by controller 106 and vehicles 104a . . . 104n of FIG. 1. In step 300, a plurality of devices is registered with a controller hardware apparatus. In step 302, charging attributes of the devices are generated based on analysis of detected operational data associated with the plurality of devices. In step 304, charging code for implementing a charging plan for wirelessly charging a power source for each device is generated and executed.

Generating the charging code may include:

1. Periodically analyzing historical charging event data associated with historical charging processes executed with respect to the plurality of devices.
2. Detecting a charge state for each device.
3. Determining a charge priority level for each device.
4. Determining a typical charging pattern associated with each device.
5. Determining a geographical location for each device.

In step 308, a first device of the plurality of devices is identified based on results of step 304. The first device comprises a first power source requiring a charge. In step 310, at least one vehicle is deployed to a location of the first device. Deploying the at least one vehicle may include: selecting the at least one vehicle based on charging requirements of the plurality of devices and available charging vehicle resources; determining an optimal travel path for deployment; and receiving a notification indicating an arrival at the location and status updates associated with the at least one vehicle. Determining the optimal travel path may include determining and avoiding any obstructions (e.g., animate or inanimate objects) located within a travel path between the at least one vehicle and the first device. In step 312, a charging process for charging the first power source is executed upon arrival of the at least one vehicle to the location of the first device. The charging process may include: receiving a signal indicating a charge request for charging the first device; determining security settings and configurations associated with the at least one vehicle; evaluating the request based on said executing the charge code and determining the security settings and configurations; determining a charging priority level of the first device with respect to additional devices located within a specified vicinity of the first device; and wirelessly charging the first power source. Alternatively, the charging process may include: monitoring a charge level of the first power source and additional parameters of the first device; and in response to detecting the charge level source as falling below a threshold, identifying a quantity of vehicles necessary to increase the charge level of the first power source to a charge level exceeding a specified charge level threshold; identifying the location of the first device; determining a location of the identified quantity of vehicles in relation to the location of the first device; discharging (while the vehicle is in motion or stationary) stored energy of the at least one vehicle into the first device to increase the charge level of the first power source to the charge level exceeding the specified charge level threshold. As an additional alternative, the charging process may include: monitoring a charge level of the first power source and additional parameters of the first device; determining that the first device is scheduled for usage for a specified time period; instructing the at least one vehicle to remain idle until the specified time period has elapsed; and discharging (in response to determining that the specified time period has elapsed) stored energy of the at least one vehicle into the first device to increase the charge level of the first power source to the charge level exceeding the specified charge level threshold.

In step 318, at least one vehicle is deployed to a location of a charging station. In step 320, a vehicular charging process for charging a power source of the at least one vehicle is executed upon arrival at the charging station.

Figure 4:
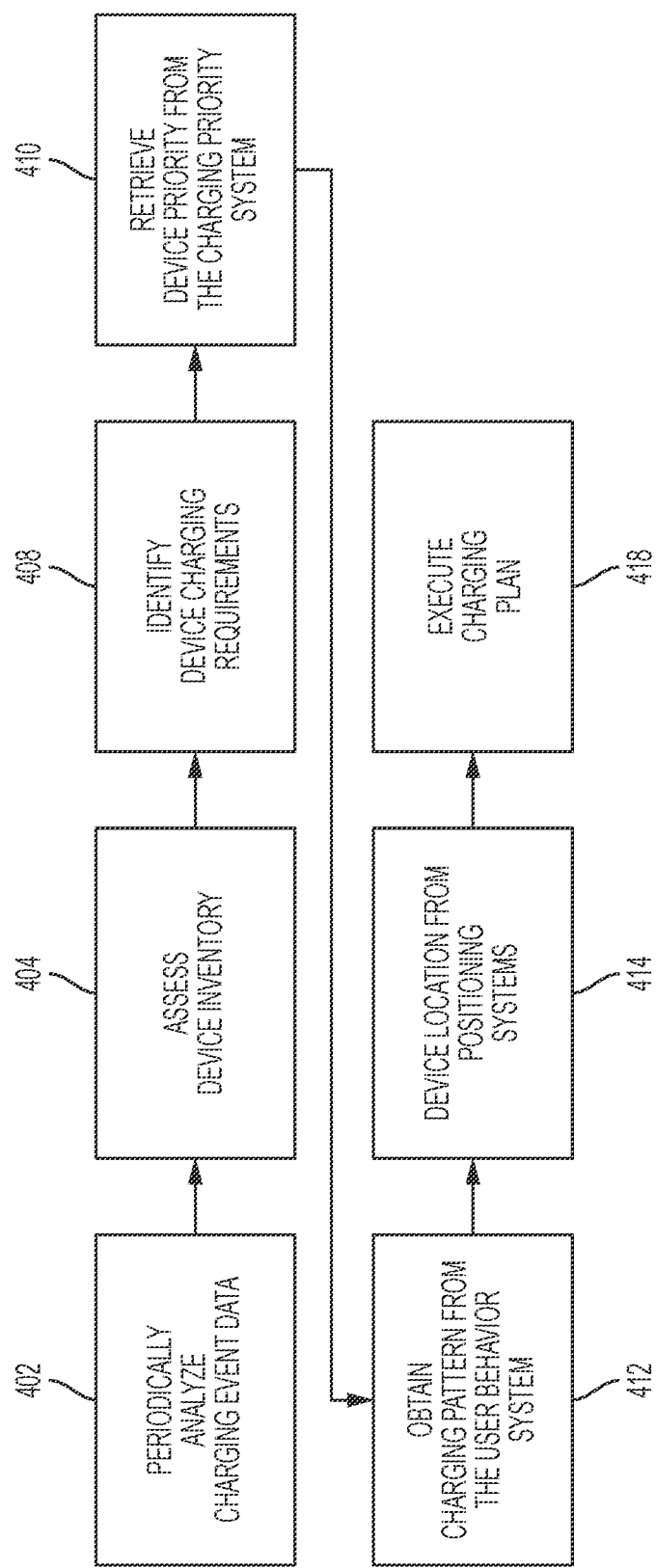
FIG. 4 illustrates an algorithm detailing a process enabled by the system of FIG. 1 for planning the charging process of FIG. 3, in accordance with embodiments of the present invention.

FIG. 4 illustrates an algorithm detailing a process enabled by system 100 of FIG. 1 for planning the charging process of step 312 of FIG. 3, in accordance with embodiments of the present invention. In step 402, a controller (e.g., controller 106 of FIG. 1) periodically analyzes charging event data associated with previous and current charging events executed with respect to multiple devices requiring a charge. In step 404, an inventory list of the devices is assessed. In step 408, charging requirements (e.g., voltage and current requirements, battery types, etc.) for the devices are identified. In step 410, a list specifying a charging priority for each of the devices with respect to each other is retrieved. In step 412, a charging pattern (for charging the devices) is retrieved. In step 414, a location for each of the devices is determined via a GPS, WIFI, RFID, or NFC implemented process. In step 418, a charging plan is determined based on the aforementioned steps.

Figure 5:
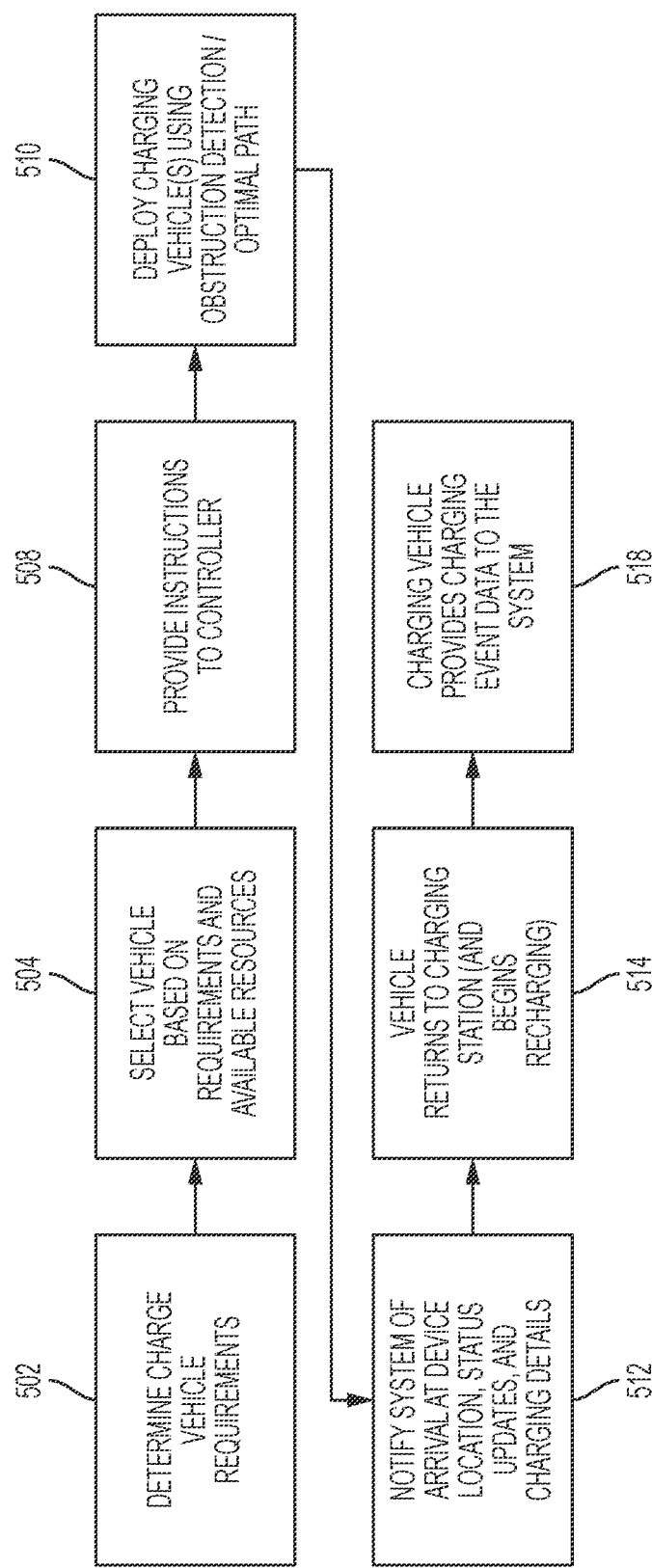
FIG. 5 illustrates an algorithm detailing a process for executing a deployment step of FIG. 3, in accordance with embodiments of the present invention.

FIG. 5 illustrates an algorithm detailing a process for executing step 318 of FIG. 3, in accordance with embodiments of the present invention. In step 502, charge vehicle requirements are determined based on device charge and capacity needs, environmental conditions, and a location of a device requiring a charge. In step 504, a vehicle (for providing a charge) is selected based on the charge vehicle requirements (of step 502) and available vehicles. In step 508, instructional code (for implementing the charging process) is generated and stored. In step 510, a charging vehicle is deployed (to a device requiring a charge) via execution of obstruction detection and optimal path determination code. In step 512, the system is notified that the vehicle has arrived at a location of the device. A locational status with periodic updates and charging details is provided for the system. Upon completion of the charging process, the charging vehicle is directed back (in step 514) to the controller for recharging. In step 518, all charging event data retrieved by the vehicle is stored within the system.

Figure 6:
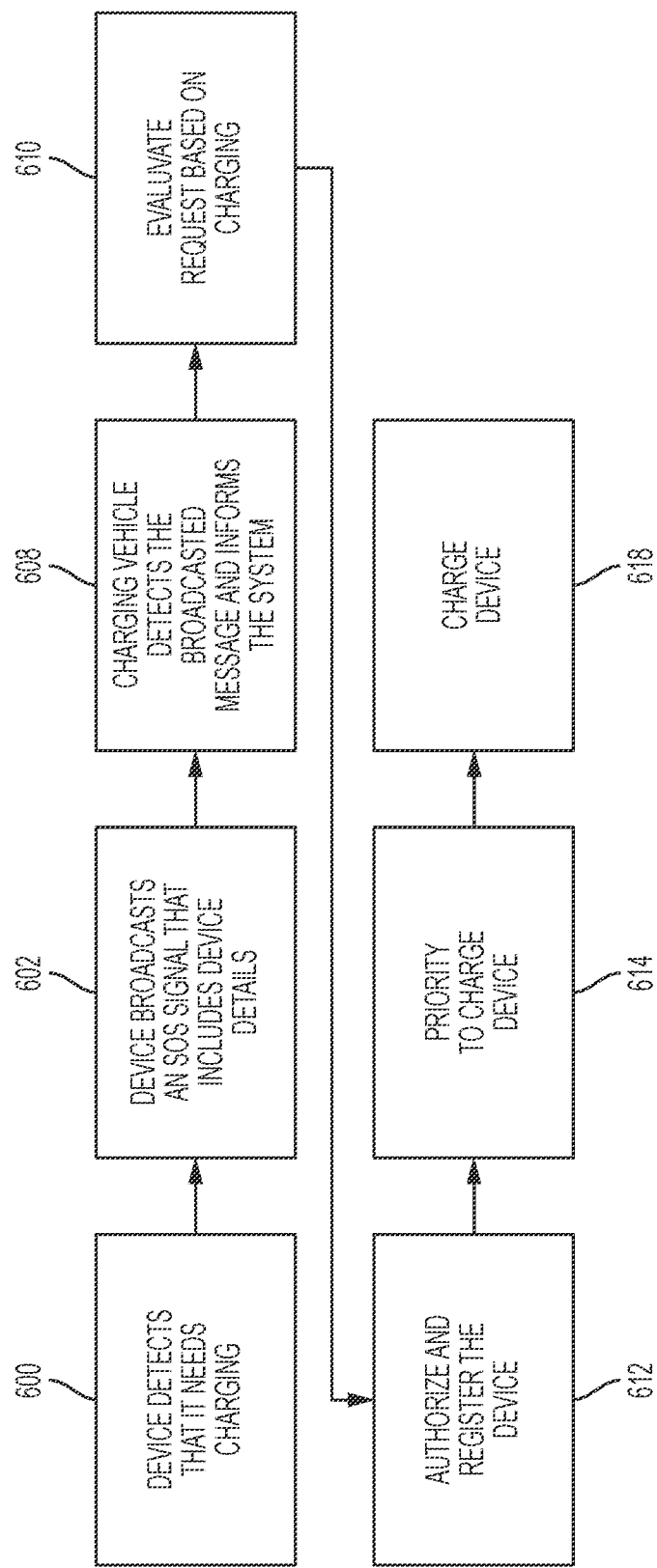
FIG. 6 illustrates an algorithm detailing an SOS recharge request, in accordance with embodiments of the present invention.

FIG. 6 illustrates an algorithm detailing an SOS recharge request, in accordance with embodiments of the present invention. In step 600, a hardware device (e.g., one of devices 116a . . . 116n of FIG. 1) executes self-diagnostic code and determines it requires a battery recharge. In step 602, the hardware device broadcasts an SOS signal including operational details (e.g., charge/capacity needs, device name, model, battery type, device owner, etc.) associated with the hardware device. In step 608, a charging vehicle (e.g., one of vehicles 104a . . . 104n of FIG. 1) detects the broadcasted SOS signal and notifies a controller device. In step 610, the controller device evaluates the SOS signal based on generated charging code for implementing a charging process. In step 612, the hardware device receives authorization for charging and is subsequently registered with the controller. In step 614, an associated priority (with respect to additional devices) for charging is determined. In step 618, the hardware device is charged in accordance with the associated priority.

Figure 7:
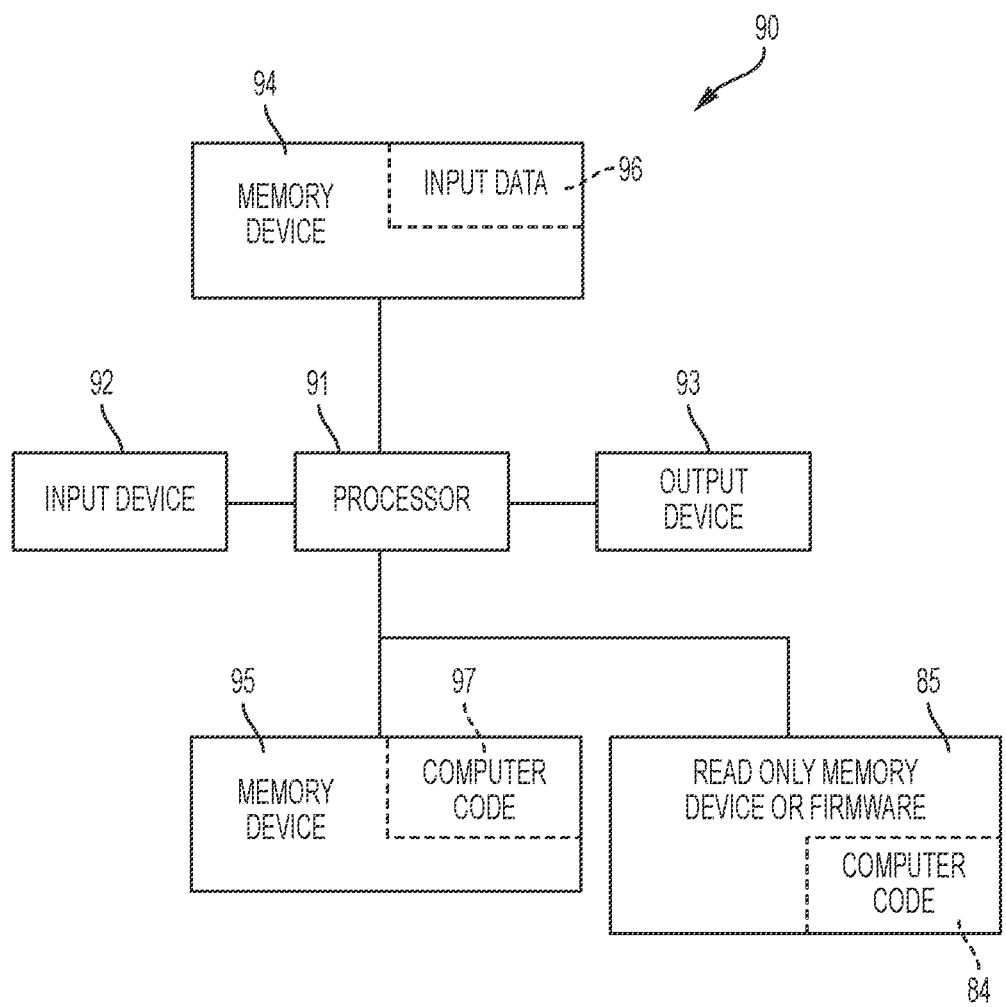
FIG. 7 illustrates a computer system used by or comprised by the system of FIG. 1 for improving wireless charging technology associated with providing device charging attributes and deploying at least one vehicle to a location of devices requiring a charge based on the charging attributes, in accordance with embodiments of the present invention.

FIG. 7 illustrates a computer system 90 (e.g., controller 106 and vehicles 114a . . . 114n (i.e., control hardware 119a . . . 119n and sensors 117a . . . 117n internal to vehicles 104a . . . 104n) used by or comprised by the system of FIG. 1 for improving wireless charging technology associated with providing device charging attributes and deploying at least one vehicle to a location of devices requiring a charge based on the charging attributes, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-6) for improving wireless charging technology associated with providing device charging attributes and deploying at least one vehicle to a location of devices requiring a charge based on the charging attributes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithms of FIGS. 3-6) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including an algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for improving wireless charging technology associated with providing device charging attributes and deploying at least one vehicle to a location of devices requiring a charge based on the charging attributes. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for improving wireless charging technology associated with providing device charging attributes and deploying at least one vehicle to a location of devices requiring a charge based on the charging attributes. In another embodiment, the invention provides a business method that performs the process steps of the invention on a subscription, advertising, and/or fee basis. That is, a service supplier, such as a Solution Integrator, could offer to improve wireless charging technology associated with providing device charging attributes and deploying at least one vehicle to a location of devices requiring a charge based on the charging attributes. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties. While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A vehicle implemented wireless charging improvement method comprising:
    registering, by a processor of a controller hardware apparatus, a plurality of devices with said controller hardware apparatus, wherein each device of said plurality of devices comprises a handheld computing device;
    generating, by said processor based on analysis of operational data associated with said plurality of devices, charging attributes of said plurality of devices;
    generating, by said processor based on said charging attributes, charging code for implementing a charging plan for wirelessly charging a power source for each said device of said plurality of devices;
    executing, by said processor, said charging code;
    identifying, by said processor in response to said executing, a first device of said plurality of devices comprising a first power source requiring a charge or a repair;
    identifying, by said processor, a number of vehicles necessary to charge a battery level of said first device or to repair said first device;
    deploying, by said processor based on results of said identifying, at least one vehicle associated with said number of vehicles to a location of said first device;
    detecting, by said processor, one or more fingers of a user in physical contact with said first device;
    prompting, by said processor in response to results of said detecting, said user to disengage said physical contact with said first device;
    after said prompting, executing upon arrival of said at least one vehicle to said location of said first device, by said processor via said at least one vehicle, a charging process for charging said first device or a repair process for repairing said first device, wherein said executing said charging process for charging said first device comprises:
        monitoring a charge level of said first power source and additional parameters of said first device;
        determining that said first device is scheduled for usage for a specified time period;
        instructing said at least one vehicle to remain idle until said specified time period has elapsed; and
        discharging, in response to determining that said specified time period has elapsed, stored energy of said at least one vehicle into said first device to increase said charge level of said first power source to said charge level exceeding said specified charge level threshold.

2. The method of claim 1, wherein said generating said charging code comprises:
    periodically analyzing historical charging event data associated with historical charging processes executed with respect to said plurality of devices;
    detecting a charge state for each said device;
    determining a charge priority level for each said device;
    determining a typical charging pattern associated with each said device; and
    determining a geographical location for each said device.

3. The method of claim 1, wherein said deploying said at least one vehicle comprises:
    selecting said at least one vehicle based on charging requirements of said plurality of devices and available charging vehicle resources;
    determining an optimal travel path for said deploying; and
    receiving by said controller hardware apparatus from said at least one vehicle, a notification indicating an arrival at said location and status updates associated with said at least one vehicle.

4. The method of claim 3, wherein said determining said optimal travel path comprises determining and avoiding any obstructions located within a travel path between said at least one vehicle and said first device.

5. The method of claim 4, wherein said obstructions comprise objects selected from the group consisting of animate objects and inanimate objects.

6. The method of claim 1, further comprising:
    deploying, by said processor in response to termination of said executing, said at least one vehicle to a location of a charging station; and
    executing upon arrival of said at least one vehicle to said location of said charging station, by said processor, a vehicular charging process for charging a power source of said at least one vehicle.

7. The method of claim 1, wherein said executing said charging process for charging said first device further comprises:
    receiving from said first device by said controller hardware apparatus via said at least one vehicle, a signal indicating a charge request for charging said first device;
    determining security settings and configurations associated with said at least one vehicle; and
    evaluating, by said processor, said request based on said executing said charge code and said determining said security settings and said configurations.

8. The method of claim 1, further comprising:
    providing at least one support service for at least one of creating, integrating, hosting, maintaining, and deploying computer-readable code in the control hardware, said code being executed by the computer processor to implement: said registering, said generating said charging attributes, said generating said charging code, said executing said charging code, said identifying, said deploying, and said executing said charging process.

9. A computer program product, comprising a computer readable hardware storage device storing a computer readable program code, said computer readable program code comprising an algorithm that when executed by a processor of a controller hardware apparatus implements a vehicle implemented wireless charging improvement method, said method comprising:

registering, by said processor, a plurality of devices with said controller hardware apparatus, wherein each device of said plurality of devices comprises a handheld computing device;

generating, by said processor based on analysis of operational data associated with said plurality of devices, charging attributes of said plurality of devices;

generating, by said processor based on said charging attributes, charging code for implementing a charging plan for wirelessly charging a power source for each said device of said plurality of devices;

executing, by said processor, said charging code;

identifying, by said processor in response to said executing, a first device of said plurality of devices comprising a first power source requiring a charge or a repair;

identifying, by said processor, a number of vehicles necessary to charge a battery level of said first device or to repair said first device;

deploying, by said processor based on results of said identifying, at least one vehicle associated with said number of vehicles to a location of said first device;

detecting, by said processor, one or more fingers of a user in physical contact with said first device;

prompting, by said processor in response to results of said detecting, said user to disengage said physical contact with said first device;

after said prompting, executing upon arrival of said at least one vehicle to said location of said first device, by said processor via said at least one vehicle, a charging process for charging said first device or a repair process for repairing said first device, wherein said executing said charging process for charging said first device comprises:

monitoring a charge level of said first power source and additional parameters of said first device;

determining that said first device is scheduled for usage for a specified time period;

instructing said at least one vehicle to remain idle until said specified time period has elapsed; and discharging, in response to determining that said specified time period has elapsed, stored energy of said at least one vehicle into said first device to increase said charge level of said first power source to said charge level exceeding said specified charge level threshold.

10. The computer program product of claim 9, wherein said generating said charging code comprises:

periodically analyzing historical charging event data associated with historical charging processes executed with respect to said plurality of devices;

detecting a charge state for each said device;

determining a charge priority level for each said device;

determining a typical charging pattern associated with each said device; and determining a geographical location for each said device.

11. The computer program product of claim 9, wherein said deploying said at least one vehicle comprises:

selecting said at least one vehicle based on charging requirements of said plurality of devices and available charging vehicle resources;

determining an optimal travel path for said deploying; and receiving by said controller hardware apparatus from said at least one vehicle, a notification indicating an arrival at said location and status updates associated with said at least one vehicle.

12. The computer program product of claim 11, wherein said determining said optimal travel path comprises determining and avoiding any obstructions located within a travel path between said at least one vehicle and said first device.

13. The computer program product of claim 12, wherein said obstructions comprise objects selected from the group consisting of animate objects and inanimate objects.

14. The computer program product of claim 9, wherein said method further comprises:

deploying, by said processor in response to termination of said executing, said at least one vehicle to a location of a charging station; and executing upon arrival of said at least one vehicle to said location of said charging station, by said processor, a vehicular charging process for charging a power source of said at least one vehicle.

15. The computer program product of claim 9, wherein said executing said charging process for charging said first device further comprises:

receiving from said first device by said controller hardware apparatus via said at least one vehicle, a signal indicating a charge request for charging said first device;

determining security settings and configurations associated with said at least one vehicle; and evaluating, by said processor, said request based on said executing said charge code and said determining said security settings and said configurations.

16. A server hardware device comprising a processor coupled to a computer-readable memory unit, said memory unit comprising instructions that when executed by the computer processor implements a vehicle implemented wireless charging improvement method comprising:

registering, by said processor, a plurality of devices with said controller hardware apparatus, wherein each device of said plurality of devices comprises a handheld computing device;

generating, by said processor based on analysis of operational data associated with said plurality of devices, charging attributes of said plurality of devices;

generating, by said processor based on said charging attributes, charging code for implementing a charging plan for wirelessly charging a power source for each said device of said plurality of devices;

executing, by said processor, said charging code;

identifying, by said processor in response to said executing, a first device of said plurality of devices comprising a first power source requiring a charge or a repair;

identifying, by said processor, a number of vehicles necessary to charge a battery level of said first device or to repair said first device;

deploying, by said processor based on results of said identifying, at least one vehicle associated with said number of vehicles to a location of said first device;

detecting, by said processor, one or more fingers of a user in physical contact with said first device;

prompting, by said processor in response to results of said detecting, said user to disengage said physical contact with said first device;

after said prompting, executing upon arrival of said at least one vehicle to said location of said first device, by said processor via said at least one vehicle, a charging process for charging said first device or a repair process for repairing said first device, wherein said executing said charging process for charging said first device comprises:

monitoring a charge level of said first power source and additional parameters of said first device;
determining that said first device is scheduled for usage for a specified time period;
instructing said at least one vehicle to remain idle until said specified time period has elapsed; and
discharging, in response to determining that said specified time period has elapsed, stored energy of said at least one vehicle into said first device to increase said charge level of said first power source to said charge level exceeding said specified charge level threshold.

* * * * *